(12) United States Patent
Uno et al.

(10) Patent No.: US 6,459,537 B2
(45) Date of Patent: Oct. 1, 2002

(54) ZOOM LENS BARREL AND CAMERA (75) Inventors: Tetsuya Uno, Sakai; Dai Shintani, Kishiwada; Norihiro Inoue, Kashiba, all of (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/771,936

(22) Filed: Jan. 30, 2001

(30) Foreign Application Priority Data

Jan. 31, 2000 (JP) ........................................ 2000-021882

(51) Int. Cl.$^7$ ................................................. G02B 15/14
(52) U.S. Cl. ........................................ 359/699; 359/701
(58) Field of Search ................................. 359/699, 700, 359/701; 396/82

(56) References Cited

U.S. PATENT DOCUMENTS

| | | | | |
|---|---|---|---|---|
| 5,790,901 A | * | 8/1998 | Nakayama et al. | 396/82 |
| 5,875,359 A | | 2/1999 | Ohtake et al. | 396/80 |
| 6,018,426 A | | 1/2000 | Funahashi | 359/819 |
| 6,097,548 A | | 8/2000 | Funahashi et al. | 359/694 |

* cited by examiner

Primary Examiner—Ricky Mack
(74) Attorney, Agent, or Firm—McDermott, Will & Emery (57) ABSTRACT

A zoom lens barrel which is an integrated zoom and focus drive type zoom lens barrel that moves lens units on a single zoom line having plurality of focusing sections and plurality of zooming sections, wherein the single zoom line has characteristic that the "rate of change of the relative distance of the two lens units with regard to a barrel rotation angle" in each focusing section becomes smaller in the focusing sections of the telephoto side.

7 Claims, 10 Drawing Sheets

ZOOM LENS BARREL AND CAMERA

This application is based on patent application Ser. No. 2000-21882 filed in Japan, the content of which is hereby incorporated by reference.

BACKGROUND OF THE INVENTION

1. Field of the Invention

The present invention relates to a lens barrel which accomplishes zooming and focusing by a single drive mechanism, and a camera provided with the lens barrel.

2. Description of the Related Art

Integrated zoom and focus drive mechanisms are known which move various lens units on a single zoom line including alternating zooming intervals and focusing intervals as a construction for reducing cost and achieving compactness of the zoom lens barrel. An example of such a construction is described below with reference to FIGS. 1A and 1B.

Figure 1A:
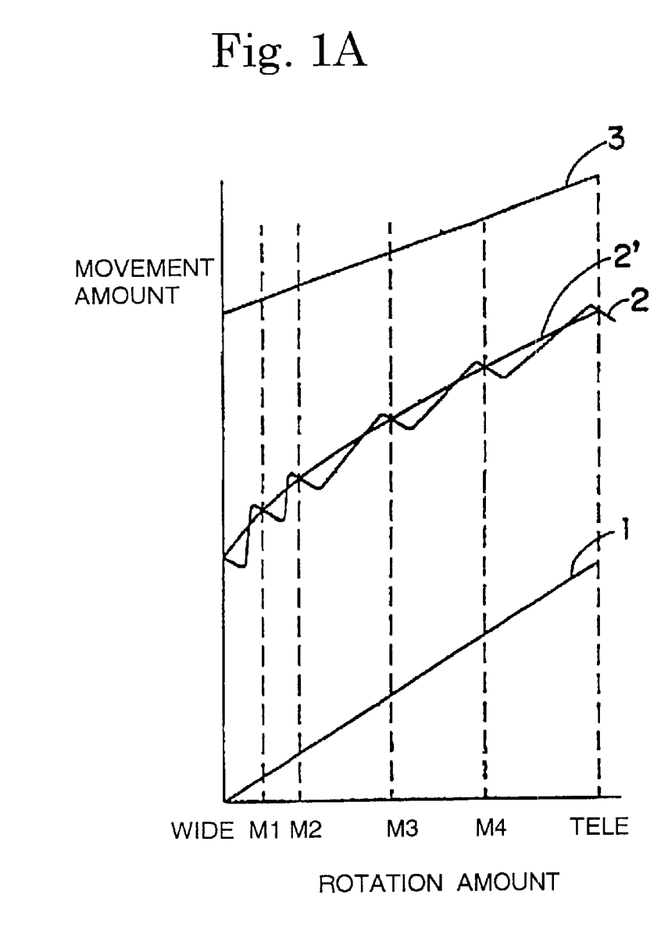
FIGS. 1A and 1B are zoom line charts of a conventional integrated zoom and focus drive type camera showing the focusing by a first lens unit and zooming by a second lens unit.
Figure 1B:
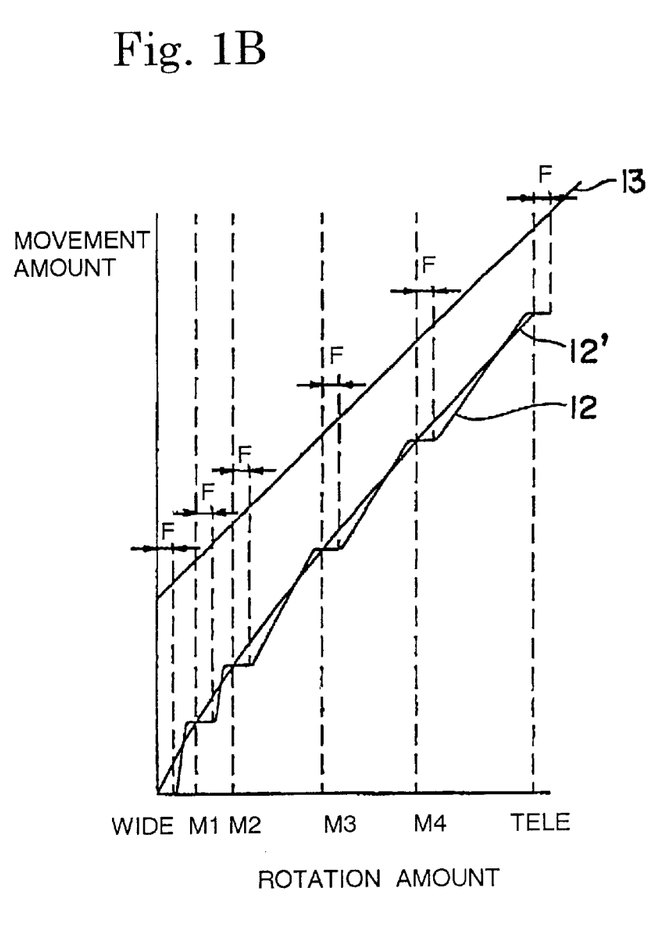

FIGS. 1A and 1B are examples of zoom charts of a two-section zoom lens barrel which accomplishes focusing by a single lens unit (first section). This zoom lens barrel includes "a stationary barrel which does not move relative to the camera body", "a cam barrel which advances and retracts relative to the stationary barrel", and "first and second lens units which advance and retract relative to the cam barrel" identically to an embodiment of the present invention which is described later.

In FIG. 1A, straight line 1 presents the extension lead of the cam barrel relative to the stationary barrel, straight line 3 represents the relative extension lead of the first lens unit (first section) with regard to the cam barrel, and step line 2 represents the relative extension lead of the second lens unit (second section) with regard to the cam barrel. Accordingly, the amount of extension of the first lens unit relative to the stationary barrel is the combination of the straight lines 1 and 3, and is represented by the straight line 13 in FIG. 1B. Similarly, the amount of extension of the second lens unit relative to the stationary barrel is the combination of the straight line 1 and the step line 2, and is represented by the step line 12 in FIG. 1B.

This zoom lens barrel utilizes four middle steps M1, M2, M3 and M4 between telephoto end (tele) and wide angle end (wide), i.e., accomplishes zooming in a total of six steps, so as to accomplish focusing (focusing section F) using the part corresponding to the flat portions of the step line 12, and accomplish zooming (zooming section) using the other parts. In this way in an integrated zoom and focus drive mechanism, each lens unit moves on a single zoom line including alternating plurality of zoom sections and plurality of focus sections.

The curve 2' in FIG. 1A represents the extension lead of the second lens unit (second section) relative to the cam barrel in the case of continuous zooming. Accordingly, the amount of extension of the second lens unit relative to the stationary barrel is represented by the curve 12' in FIG. 1B. During continuous zooming, focusing at each zoom position is accomplished by changing the relative distance of both lens units using another drive mechanism.

As shown in FIG. 1B, the first section normally moves linearly along the zoom line 13 across all zoom regions, and the second section does not move in the optical axis direction in the horizontal parts (focusing section F) of the step-like zoom line 12. That is, the "rate of change of the relative distance between the first lens unit and the second lens unit" with regard to a rotation amount (rotation angle) is the same in all focusing sections.

In general, it can be said that, in the zoom lens barrel, there is a large amount of movement of the focus position from the wide side to the tele side even when the change in the relative distance between the first section and the second section is the same. Accordingly, in a conventional integrated drive type zoom and focus zoom lens barrel wherein the rate of change of the relative distance between the first section and second section with regard to a barrel rotation angle (a constant rotation amount) is identical for all focusing sections, the amount of movement of the focus position increases relative to the same barrel rotation angle toward the tele side, as shown in FIGS. 1A and 1B, such that the focus precision disadvantageously decreases toward the tele side.

To eliminate this problem, consideration has been given to increasing the focusing resolution on the tele side as the total amount of rotation of the lens barrel increases, or increasing the amount of barrel rotation in the focusing section as the length of the zooming section becomes shorter. However, when the total amount of rotation of the barrel is increased, the total length of the cam channel (e.g., cam channel 210 shown in FIGS. 2–4) formed on the cam barrel also increases, and the strength of the barrel is reduced in that part, and the analogous cam channel overlap. Furthermore, when the number of zooming sections is reduced, the pressure angle increases in each zooming section, and as a result the smooth rotation of the barrel is hindered so as to produce another problem in that a large drive force is required for barrel rotation.

SUMMARY OF THE INVENTION

An object of the present invention is to provide a zoom mechanism using an integrated zoom and focus drive method which does not increase the total rotation of the barrel, does not increase the pressure angle in the zooming section, and does not adversely affect focus precision on the tele side.

The present invention attains these objects by providing a zoom camera having the characteristics describe below.

The zoom camera of the present invention has an integrated zoom and focus drive type zoom lens barrel which moves on a single zoom line and includes alternating plurality of focusing sections and plurality of zooming sections. With regard to the "adjoining two lens units whose relative distance unit change most greatly affects the amount of movement of the focus position", the "rate of change of the relative distance of the two lens units with regard to a barrel rotation angle" in each focusing section becomes smaller in the focusing sections of the tele side.

In general, "the amount of movement of the focus position with regard to the change in the relative unit distance of the two opposing lens units" increases from the wide side to the tele side. On the other hand, "the amount of movement of the focus position relative to a barrel rotation angle" is expressed as the sum of "the amount of movement of the focus position (with regard to the change in the relative unit distance of the two opposing lens units" and "the rate of change of the relative distance of the two lens units with regard to the barrel rotation angle." Accordingly, "the amount of movement of the focus position relative to the barrel rotation angle" can be fixed in the entire zoom range by setting the rate of change of the relative distance of the two lens units with regard to the barrel rotation angle" to be smaller in conjunction with the advance to the tele side. That is, the focus precision is not adversely affected with the advance to the tele side.

When there are only two lens units, the "rate of change of the relative distance of the two lens units with regard to the barrel rotation angle" may be reduced in conjunction with the advance to the tele side in observation of these two lens units. When there are three or more lens units, similar setting is accomplished in observation of "the amount of unit change of the relative distance of the two opposing lens units to affect the greatest influence on the movement of the focus position". Among the two opposing lens units, the two opposing lens units affecting the greatest influence on the movement of the focus position differs depending on the specific lens construction, but the present invention includes all such lens units.

According to the present invention, the two opposing lens units wherein the amount of unit change in their relative distance most greatly influences the movement of the focus position in the aforesaid zoom lens camera are constructed such that the rate of change of the relative distance of the two lens units with regard to a barrel rotation angle in each focusing section becomes smaller advancing to the tele side, and thereby provides a method whereby the amount of movement of the focus position is near constant relative to the throughout the entire zoom region.

The zoom camera of the present invention is constructed such that "the amount of movement of the focus position is near constant relative to the barrel rotation angle throughout the entire zoom region" and each lens unit moves on the zoom line. In this case the consideration is not given to the rate of change of the relative distance of only the two specific lens units among a plurality of lens units, but rather consideration is given to the change in relative distance between several groups of opposed lens units (desirably all groups).

In the present invention, "the amount of movement of the focus position relative to a barrel rotation angle is the amount obtained by dividing by the zoom lens F value", but each lens unit moves on the zoom line such that the amount of such change remains constant throughout the entire zoom region. Since the focus width determined from the diameter of the allowable circle of confusion permitted at each focal length is proportional to the F value, consideration of the change not only in the amount of movement of the focus position but also in F value is advantageous from the perspectives of rotation angle and cam optimization. In this case also consideration is given to the change in relative distance between several groups (and desirably all groups) of lens units.

These and other objects, advantages and features of the invention will become apparent from the following description thereof taken in conjunction with the accompanying drawings which illustrate specific embodiments of the invention.

BRIEF DESCRIPTION OF THE DRAWINGS

In the following description, like parts are designated by like reference numbers throughout the several drawings.

DESCRIPTION OF THE PREFERRED EMBODIMENTS

A first embodiment of the present invention is described in detail hereinafter with reference to the accompanying drawings.

Figure 2:
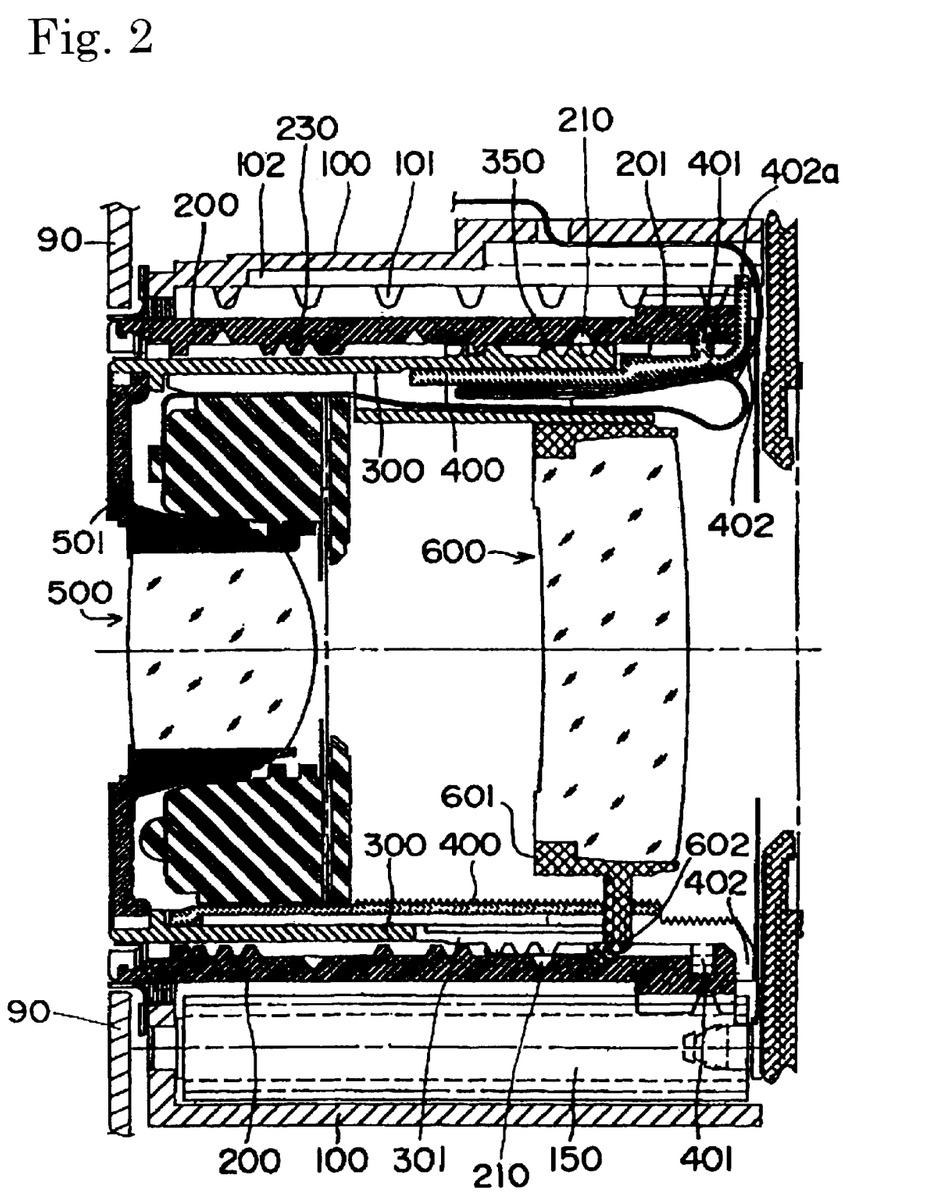
FIG. 2 is a cross section view of the zoom lens barrel in the camera of the present invention at the collapsed position.
Figure 5:
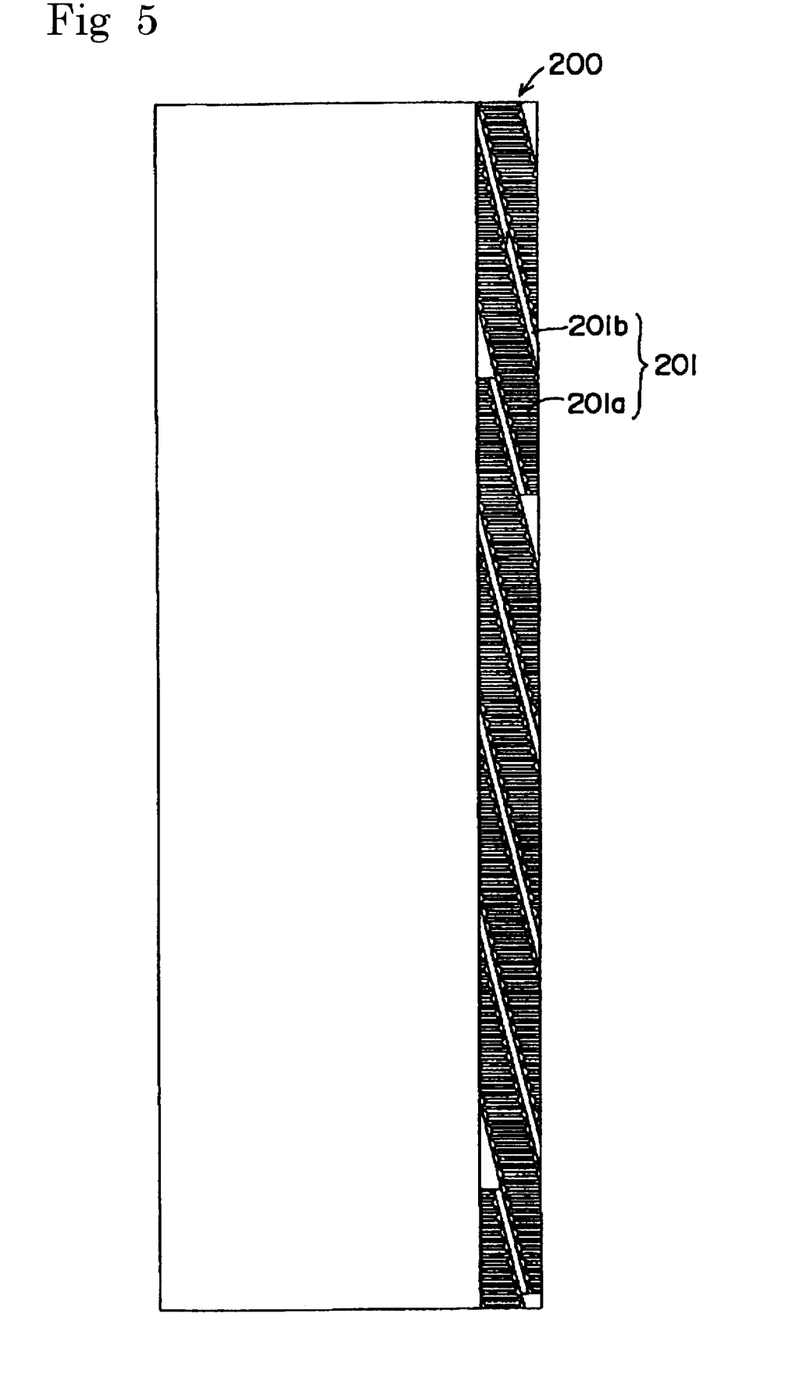
FIG. 5 is a development view showing the exterior surface shape of the cam barrel included in the zoom lens barrel of FIG. 2.

FIG. 2 is a cross section view of a lens barrel at the collapsed position. In the drawing, reference number 90 refers to an external shell forming the front surface of the camera body. A stationary barrel 100 is fixedly attached to the camera body so as to be unmovable, and a cam barrel 200 is housed in the interior side of the stationary barrel 100. The cam barrel 200 has a helicoid gear 201 on its exterior surface on the end on the photographer side, as shown in the development view of FIG. 5. The helicoid gear 201 comprises "a band gear 201a formed across the entire surface of the cam barrel 100" and "a female helicoid 201b formed at a traverse inclination to the gear 201a". The cam barrel 200 is rotated within the stationary barrel 100 by a drive force from a drive gear 150 received by the gear 201a.

The female helicoid 201b engages a male helicoid 101 formed on the interior surface of the stationary barrel 100. Accordingly, when the cam barrel 200 is rotated within the stationary barrel 100, the cam barrel 200 extends out toward the anterior direction relative to the stationary barrel 100 (i.e., relative to the camera body). The cam barrel 200 passes through the wide angle end (wide) shown in FIG. 3, and reaches the telephoto end (tele) shown in FIG. 4. In this way the cam barrel 200 advances across the stationary barrel 100 in the optical axis direction, and the total length of the drive gear 150 is approximately equal to the length of the stationary barrel 100 such that a drive force can be transmitted even when the cam barrel 200 is at any position relative to the stationary barrel 100. Since the male helicoid 101 is formed at a fixed (constant) lead angle across the entire zoom area, the amount of extension of the cam barrel 200 is linear relative to the rotation angle.

Figure 3:
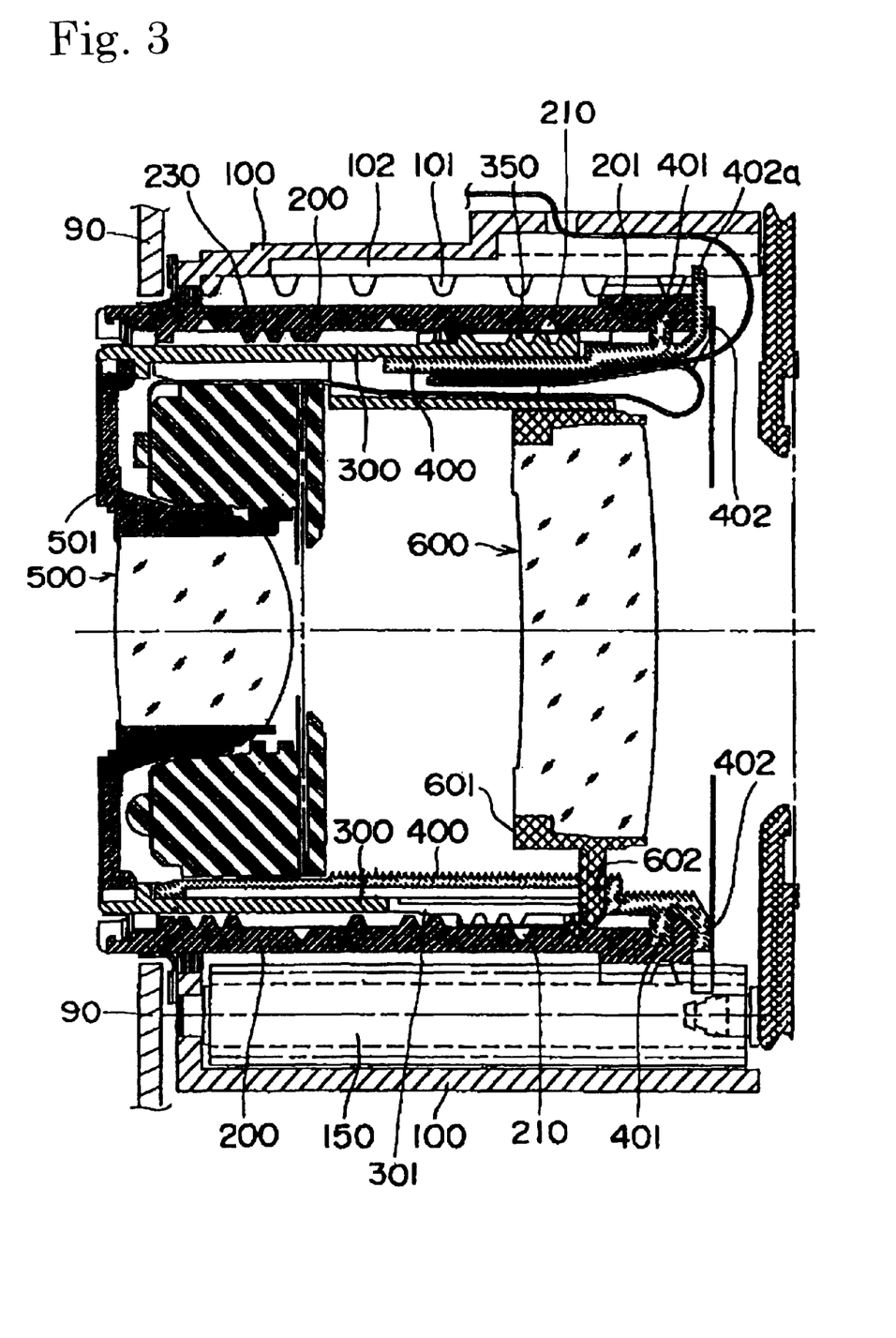
FIG. 3 is a cross section view of the zoom lens barrel of FIG. 2 at the wide position.
Figure 4:
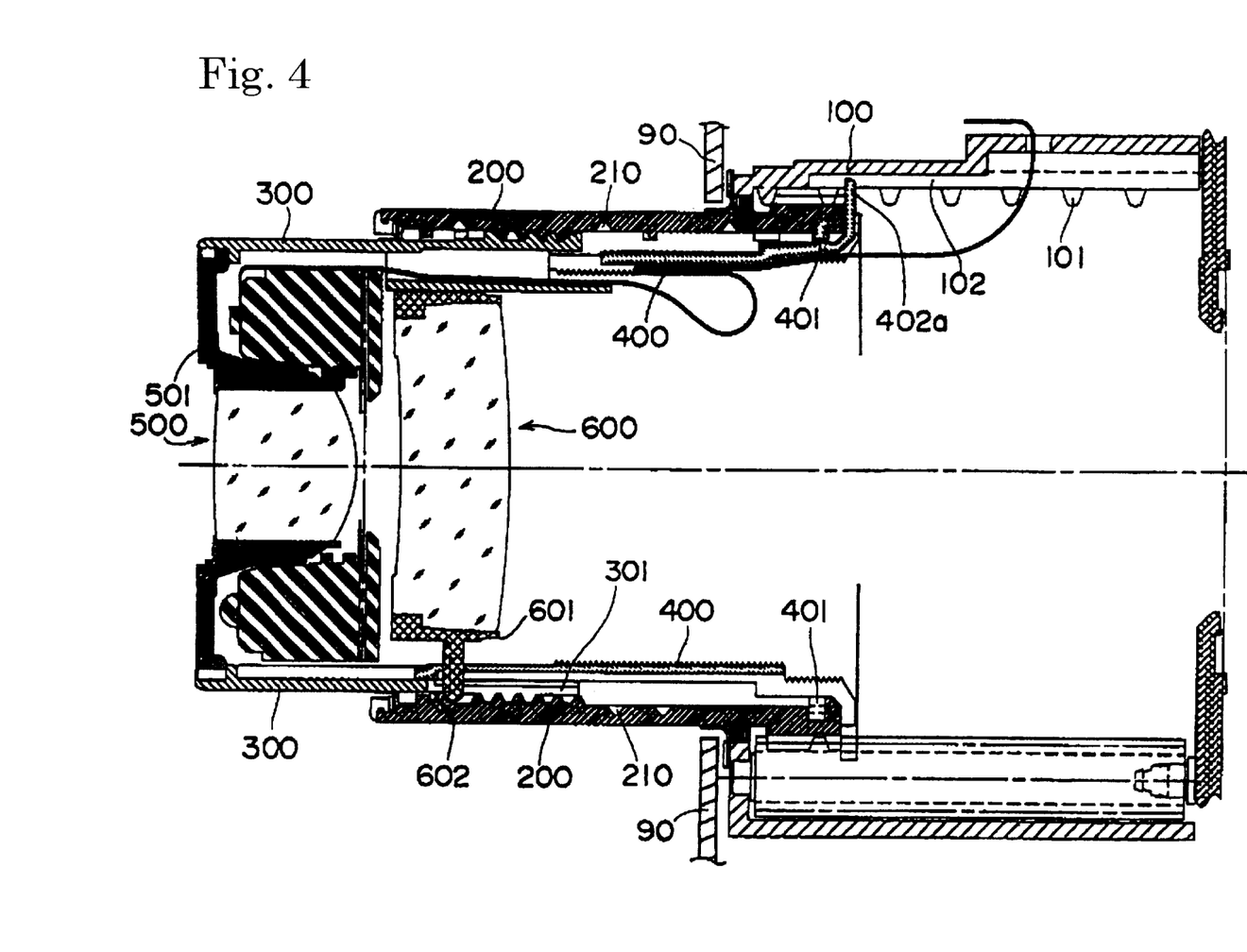
FIG. 4 is a cross section view of the zoom lens barrel of FIG. 2 at the tele position.

As shown in FIGS. 2~4, a combined rectilinear guide barrel 400 and advance barrel 300 are accommodated within the cam barrel 200. Although the rectilinear guide barrel 400 is relatively rotatable with regard to the cam barrel 200, it is also connected by a bayonet connector 401 so as to be relatively unmovable in the optical axis direction. The rectilinear guide barrel 400 is provided with a part 402a of a flange 402 provided on the end on the photographer side which extends to the exterior side in the radius direction, and this part 402a engages a rectilinear guide channel 102 provided on the interior surface of the stationary barrel 100. For this reason the rectilinear guide barrel 400 is relatively unrotatable with regard to the stationary barrel 100, and is relatively movable in the optical axis direction.

Accordingly, when the cam barrel 200 rotates within the stationary barrel 100, the rectilinear guide barrel 400 advances in the optical axis direction together with the cam barrel 200, and at this time the rectilinear guide barrel 400 rotates relative to the cam barrel 200, but does not rotate relative to the stationary barrel 100. The rectilinear guide channel 102 and the flange projection 402a only appear once in each of the FIGS. 2~4, they are actually provided in plurality in the circumferential direction.

The advance barrel 300 is relatively advancable in the optical axis direction with regard to the rectilinear guide barrel 400, but relative rotation is not possible. That is, since the rectilinear guide barrel 400 is relatively unrotatable with regard to the stationary barrel 100, as a result the advance barrel 300 also is relatively unrotatable with regard to the stationary barrel 100. However, a specific helicoid 350 is formed on the exterior surface of the advance barrel 300, and this helicoid 350 engages a specific helicoid 230 formed on the interior surface of the cam barrel 200. Accordingly, when the cam barrel 200 is rotated within the stationary barrel 100, the advance barrel 300 is guided by the rectilinear guide barrel 400 via the interaction between these helicoids 350 and 230, and advances in specific movement in the optical axis direction relative to the cam barrel 200. The amount of relative movement of the advance barrel 300 with regard to the stationary barrel 100 is expressed as the sum of "amount of movement in the optical axis direction of the cam barrel 200 relative to the stationary barrel 100" and "the amount of movement in the optical axis direction of the advance barrel 300 relative to the cam barrel 200". 20 As shown in FIGS. 2~4, since the advance barrel 300 integratedly holds a first lens unit 500 through a support frame 501 (focus lens unit support frame), the movement of the advance barrel 300 is the movement of the first lens unit 500.

The movement of a second lens unit 600 (second section) is described below. A cam follower pin 602 protruding radially from lens frame 601 holding the second lens unit 600 engages the interior of a cam channel 210 having a specific shape formed on the interior surface of the cam barrel 200. Although only a single cam follower pin 602 is represented in each cross section of FIGS. 2~4, actually three cam follower pins protrude from the surface of the ring-shaped lens frame 601. On the other hand, three rectilinear guide slots 301 corresponding to the cam follower pins extend linearly in the optical axis direction on the wall of the advance barrel 300. As with the cam follower pins 602, only a single rectilinear guide slot 301 is shown in the cross section views of FIGS. 2~4.

As described previously, the advance barrel 300 does not rotate relative to the stationary barrel 100 even when the cam barrel 200 rotates relative to the stationary barrel 100. In other words, the cam barrel 200 and the advance barrel 300 rotate relatively. Accordingly, the follower pin 602 engaged with both the linear guide slot 301 formed on the advance barrel 300 and the cam channel 210 formed on the interior surface of the cam barrel 200 moves in the optical axis direction relative to the cam barrel 200 guided by the advance guide slot 301 when the cam barrel 200 is rotated. Since the cam barrel 200 itself also moves relative to the stationary barrel 100, the result is that the amount of relative movement of the second lens unit 600 held by the lens frame 601 provided with a follower pin 602 with regard to the stationary barrel 100 is expressed as the sum of "the amount of movement in the optical axis direction of the cam barrel 200 relative to the stationary barrel 100" and "the amount of movement in the optical axis direction of the lens frame 601 relative to the cam barrel 200".

As can be understood from the description above, the amount of movement of the first lens unit 500 relative to the stationary barrel 100 can be determined by "the shape of each helicoid 230 and 350 determining the amount of relative movement of the cam barrel 200 and the advance barrel 300". Furthermore, the amount of movement of the second lens unit 600 relative to the stationary barrel 100 can be determined by "the shape of the cam channel 210 determining the amount of relative movement of the cam barrel 200 and the lens frame 601". In other words, A zoom lens barrel having various zoom lines can be constructed by suitably changing the shape of each of the aforesaid helicoids and cam channel. The present invention suitably selects these shapes to set the amount of relative movement of each lens unit (shape of zoom line chart) as described below, and in this way sets the amount of movement of the focus position relative to a barrel rotation angle so as to be equal in all zoom sections, and so as to be proportional to the F value of the zoom lens. Conversely, in the present invention, the shape of the zoom line chart itself is important as described below, and, therefore, and although specific examples of shapes of helicoids and cam channels are used, the present invention is not limited to these examples. Each zoom line described below is dependent on the helicoids and cam channel formed on the plurality of parts comprising the barrel, and the total amount of movement of each lens unit is expressed relative to the camera body.

Figure 6:
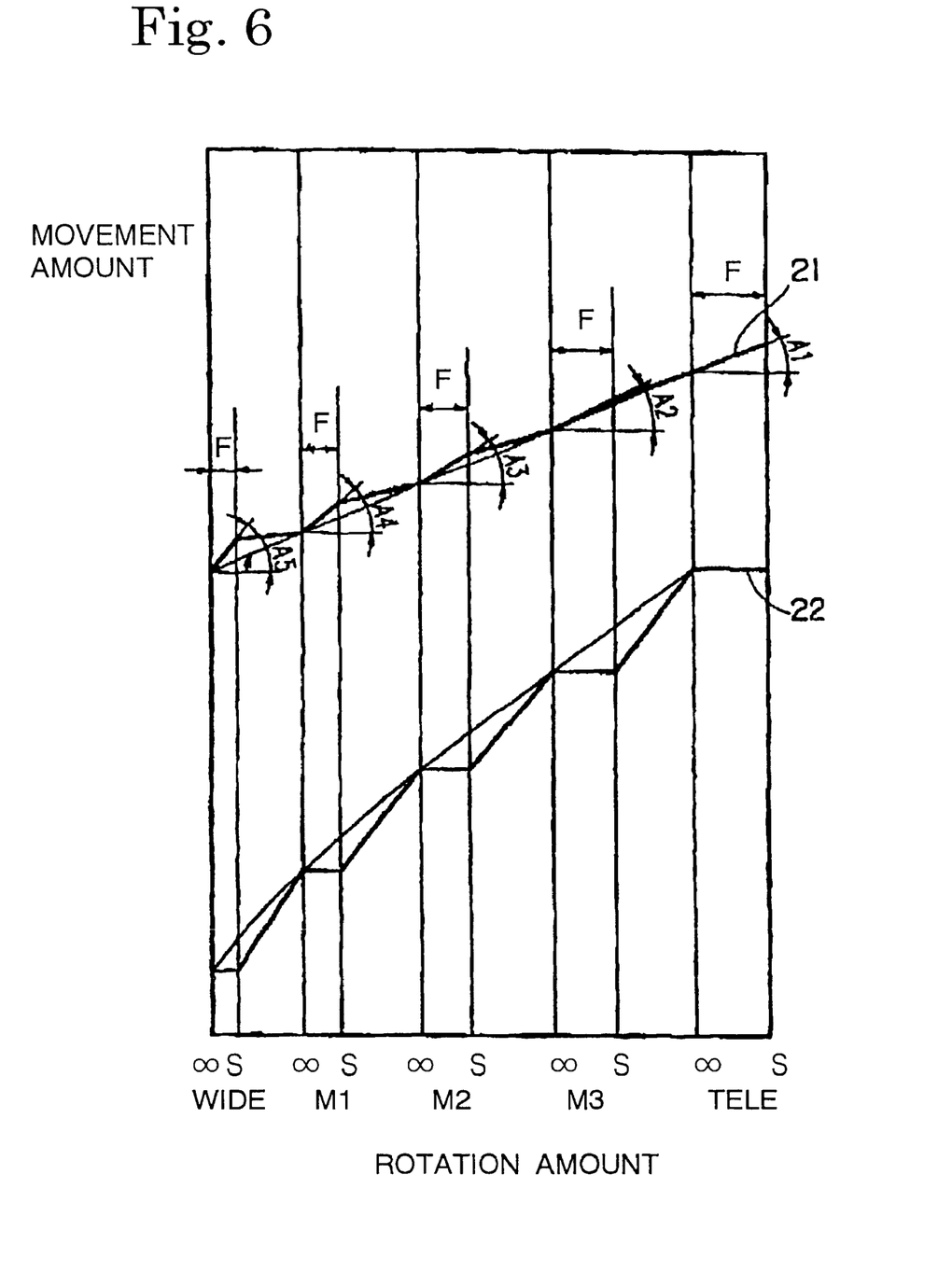
FIG. 6 is a zoom line chart of the camera of a first embodiment of the invention.

FIG. 6 shows the zoom line chart of a first embodiment of the invention. In the example of FIG. 6, the zoom lens barrel has a first and second lens units, wherein the first lens unit moves along zoom line 21, and the second lens unit moves along the zoom line 22. In this zoom lens barrel, the zoom line 22 becomes horizontal in focusing sections F at WIDE, M1, M2, M3 and TELE. That is, during focusing, the second lens unit does not move in the optical axis direction, and only the first lens unit performs focusing between infinity∞ and shortest S.

A characteristic of the zoom line chart of FIG. 6 is that the slope of the zoom line 21 in each focusing section becomes smaller in advancing through the focusing sections to the tele side. That is, since the zoom line 22 is horizontal in each focusing section, when "the rate of change of the relative distance of both lens units with regard to a barrel rotation angle" is designated A (A1, A2, A3, A4, A5), the value of A becomes smaller advancing through the focusing sections toward the tele side (A1<A2<A3<A4<A5).

On the other hand, generally when "the amount of movement of the focus position relative to the change in the relative unit distance of both lens units" is designated B (B1, B2, B3, B4, B5), the value of B increases toward the tele side(B1>B2>B3>B4>B5). Since "the amount of movement of the focus position relative to a barrel rotation angle" can be expressed as A×B, the value of A×B can be fixed in all zoom regions by setting the value of A so as to become smaller in conjunction with the advance to the tele side. When strictly considering "the amount of movement of the focus position relative to a barrel rotation angle" not only is it desirable to consider the change in the value of B, but it is also desirable to change in the Fno (F value) of the zoom lens. In this case when designating B'=B/Fno, the value of B' often becomes greater with the advance to the tele side. Accordingly, the value of A×B' can be set so as to be equal in all zoom regions by setting the value of A to become smaller in conjunction with the advance toward the tele side. In contrast, in the conventional zoom lens barrel shown in FIGS. 1A and 1B wherein the value of A is fixed in all zoom regions, the value of A×B (or A×B') becomes greater in conjunction with the advance to the tele side.

Figure 7:
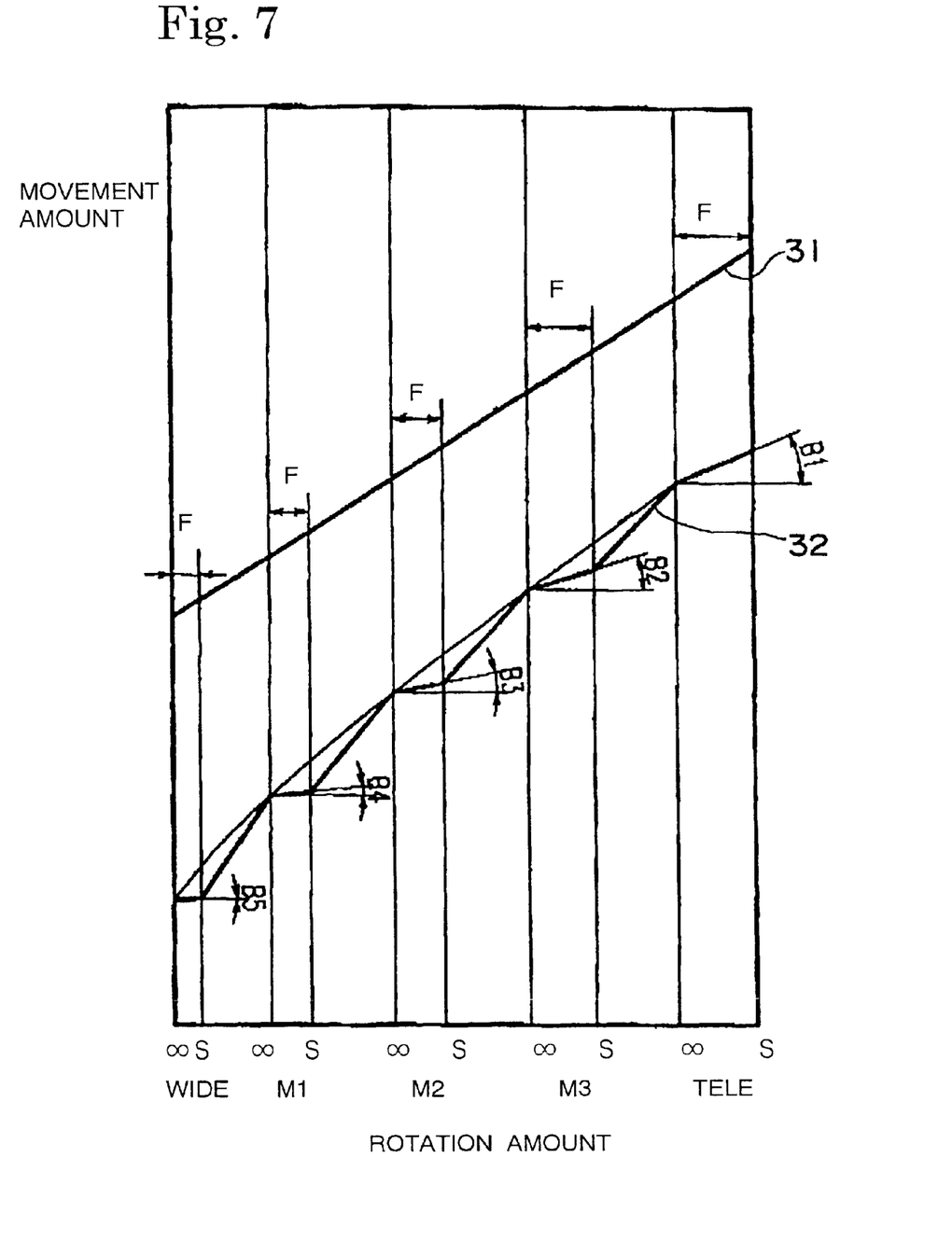
FIG. 7 is a zoom line chart of the camera of a second embodiment of the invention.

FIG. 7 shows the zoom line chart of a second embodiment of the invention. In the example shown in FIG. 7, there are two lens units similar to the example shown in FIG. 6, however, this example differs from that of FIG. 6 in that both the first lens unit and the second lens unit move in the optical axis direction during focusing. The first lens unit moves along the zoom line 31, and the second lens unit moves along the zoom line 32.

Since only the first lens unit moves in the optical axis direction in the focusing sections in the example of FIG. 6, only "the change in the relative distance of both lens units" influences the amount of movement on the focus position. In contrast, since both lens units move in the focusing sections in the example of FIG. 7, not only does "the change in the relative distance of the two lens units" but also "the change in distance between the second lens unit and the film surface" affects the amount of movement of the focus position. Accordingly, ideally the zoom lines of both lens units are determined considering both such influences. However, since the influence produced by "the change in distance between the second lens unit and the film surface" is small compared to the influence produced by "the change in the relative distance of the two lens units" only "the change in the relative distance of the two lens units" is focused on in the example of FIG. 7.

Figure 8:
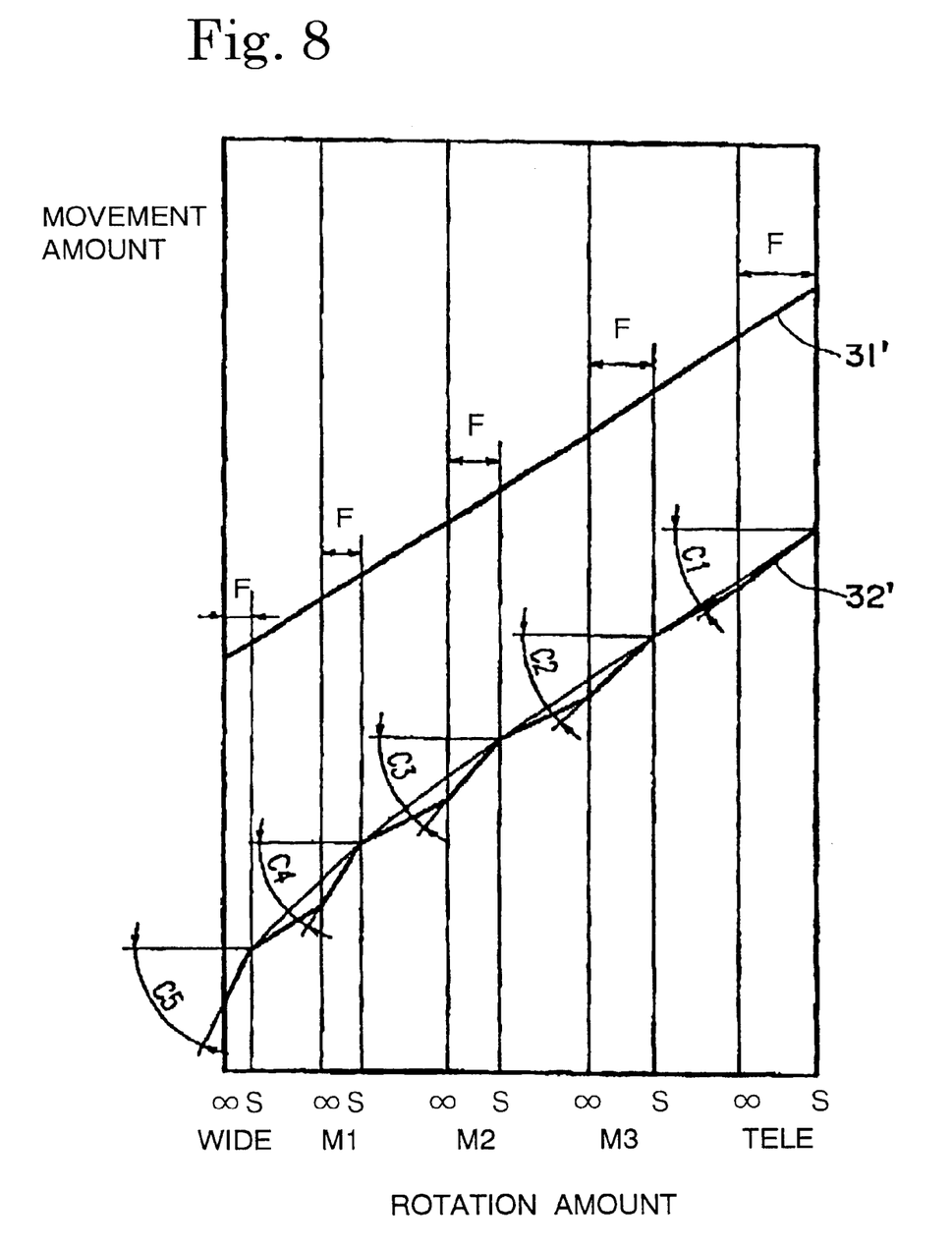
FIG. 8 is a zoom line chart of a modification of the zoom line chart of FIG. 7.

In the example of FIG. 7, since the first lens unit normally moves linearly across all zoom regions, the zoom line 31 has a fixed slope. On the other hand, the slope of the zoom line 32 is zero (horizontal) in the focusing section at the widest angle side. For this reason the slope of the zoom line 32 in each focusing section is designed so as to increase with the advance through focusing sections on the tele side such that the slope of the zoom line 32 in each focusing section approaches the slope of the zoom line 31. In this way the difference in the slopes of the zoom lines 31 and 32 becomes smaller with the advance through focusing sections on the tele side, and the value of the aforesaid rate of change A consequently becomes smaller. On the other hand, the contrasting modification shown in FIG. 8 illustrates the case wherein as the barrel extends, the photographic distance shortest S to infinity ∞ on each focusing section conversely to the example of FIG. 7. In this case since the slope of the zoom line 32' is set greater than the slope of the zoom line 31' in the focusing section on the wide side, such that the rate of change A becomes smaller with the advance through the focusing sections to the tele side, and the slope of the zoom line 32' in each focusing section is designed to become smaller with the advance through the focusing sections on the tele side (C1<C2<C3<C4<C5).

Figure 9:
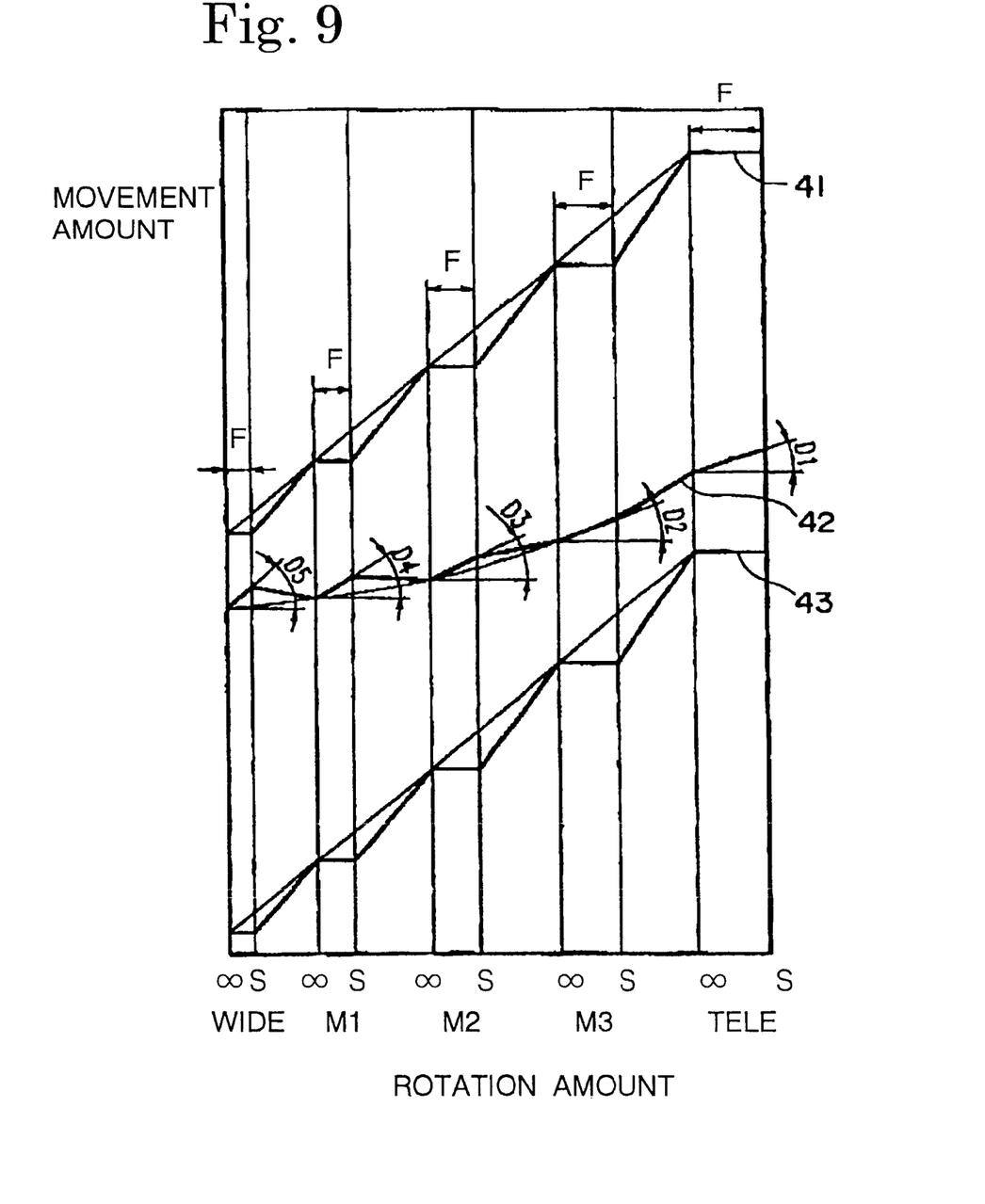
FIG. 9 is a zoom line chart of the camera of a third embodiment of the invention.

FIG. 9 shows a zoom line chart of a third embodiment of the invention. In the example of FIG. 9, the zoom lens barrel is provided with three lens units, i.e., first, second, and third lens units, wherein the first lens unit moves along the zoom line 41, the second lens unit moves along the zoom line 42, and the third lens unit moves along the zoom line 43. In this zoom lens barrel the zoom line 41 and 43 are horizontal in the focusing sections. That is, during focusing the first and third lens units do not move in the optical axis direction, and focusing is accomplished by only the second lens unit.

In the case of three lens units, since there are two groups of opposing lens pairs, ideally the zoom line chart of each lens unit is set considering the amount of change in F value and the amount of movement of the focus position relative to the change in the relative distance of two groups of lens units (this is the same for four or more lens units). However, for simplicity in the example of FIG. 9, we focus on "two opposing lens units, and the maximum influence of the amount of unit change in their relative distance on the movement of the focus position" and we use an idea similar to the cases of only two lens units as shown in FIGS. 6~8. That is, with regard to the two opposing lens units, "the rate of change A of the relative distance of both lens units with regard to a barrel rotation angle" becomes smaller with the advance through the focusing sections on the tele side. Whether "the amount of change in the relative unit distance of the first lens unit and the second lens unit" or "the amount of change in the relative unit distance of the second lens unit and the third lens unit" exerts the greatest influence on the amount of movement of the focus position differs depending on the specific construction of each lens unit. FIG. 9 shows an example wherein the greatest influence is exerted by the second lens unit and the third lens unit. A similar idea is appropriate when four or more lens units are used. The case of only two lens units is thought to be equivalent to the case of "two opposing lens units, wherein the amount of change in the relative unit distance between the lens units exerts the greatest influence on the amount of movement of the focus position".

When focusing on the second lens unit and the third lens unit, the slope of the zoom line 42 in each focusing section must become smaller with the advance through the focusing sections on the tele side, similar to the example of FIG. 6. Actually, it is understood that the zoom line 42 of FIG. 9 has this construction (D1<D2<D3<D4<D5). In this way the value of A×B (or A×B') can be fixed in all zoom regions similar to the example of FIG. 6.

Figure 10:
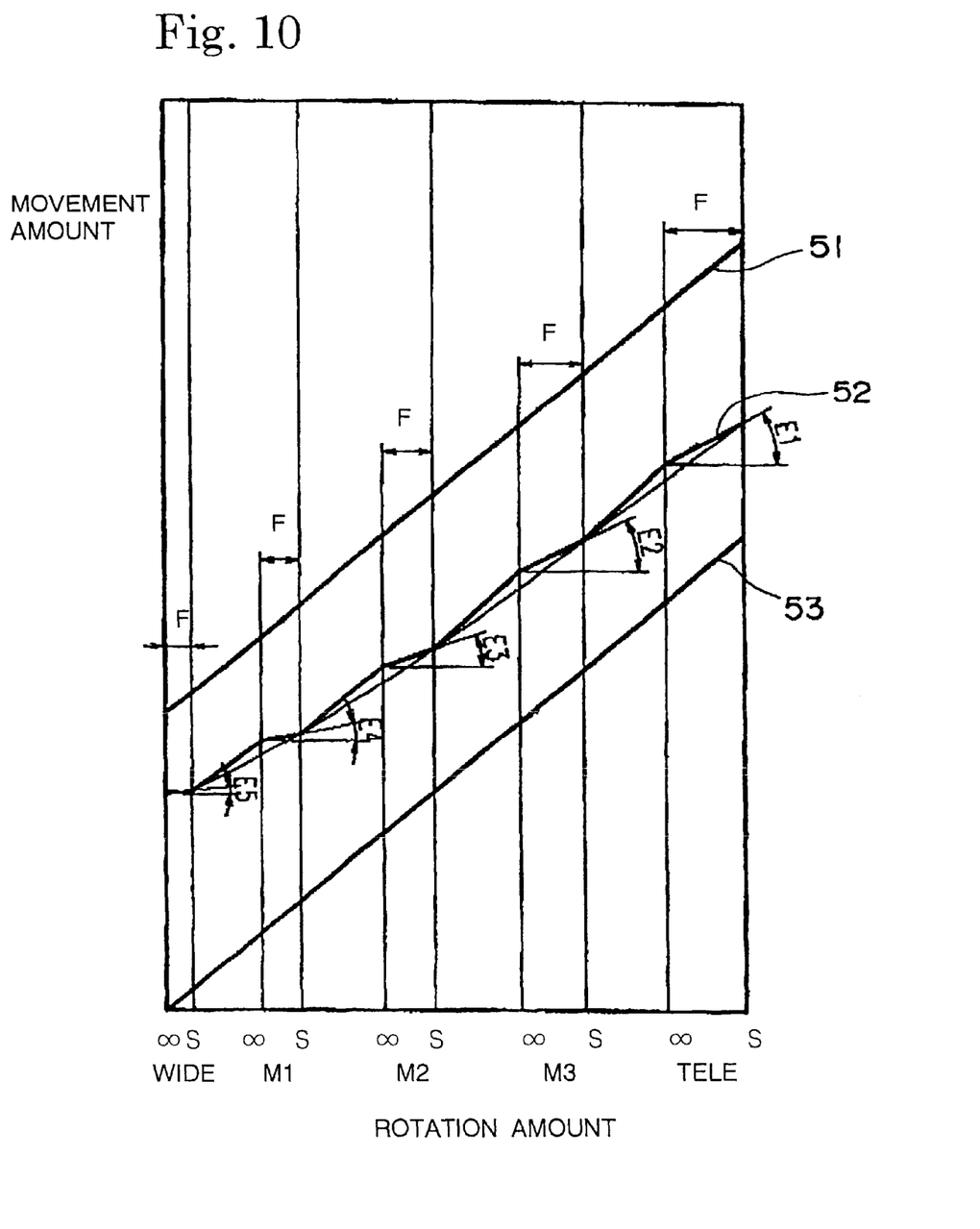
FIG. 10 is a zoom line chart of the camera of a fourth embodiment of the invention.

FIG. 10 shows the zoom line chart of a fourth embodiment of the invention. In the example of FIG. 10 there are three lens units similar to the example of FIG. 9, but this example differs from that of FIG. 9 in that all the first through third lens units move in the optical axis direction during focusing. The first lens unit moves along the zoom line 51, the second lens unit moves along the zoom line 52, and the third lens unit moves along the zoom line 53.

In the example of FIG. 9, since only two lens units move in the optical axis direction in the focusing sections, only "the change in the relative distance of each lens unit" influences the amount of movement of the focus position. In contrast, since the third lens unit also moves in the focusing section in the example of FIG. 10, "the change in the distance between the third lens unit and the film surface" also influences the amount of movement of the focus position. Accordingly, ideally all such influences are considered when determining the zoom line chart of each lens unit. However, in this case "the change in distance between the third lens unit and the film surface" is ignored for the same reason we ignored "the change in distance between the second lens unit and the film surface" in the examples of FIGS. 7 and 8. Furthermore, the change in the relative distance of the second lens unit and the third lens unit is considered as having a greater effect on the movement of the focus position similar to the example of FIG. 9.

In the example of FIG. 10, the third lens unit normally moves linearly in all zoom regions. Accordingly, the slope of the zoom line 52 in each focusing section is designed so as to increase with the advance through focusing sections on the tele side such that the slope of the zoom line 52 in each focusing section approaches the slope of the zoom line 53 (E1>E2>E3>E4>E5). For this reason the difference in the slopes of the zoom lines 52 and 53 becomes smaller with the advance through focusing sections on the tele side, and the value of the aforesaid rate of change A consequently becomes smaller.

Although preferred embodiments of the invention have been described in the foregoing detailed description and illustrated in the accompanying drawings, it will be understood that the invention is not limited to the embodiments disclosed, but is capable of numerous rearrangements, modifications and substitutions of parts and elements without departing from the spirit of the invention. Accordingly, the present invention is intended to encompass such rearrangements, modification and substitutions of parts and elements as fall within the spirit and scope of the invention.

What is claimed is:

1. A camera comprising:
   a first lens unit;
   a second lens unit;
   a cam mechanism which moves the first lens unit and the second lens unit on a single zoom line consisted of plurality of focusing sections and plurality of zooming sections;
   wherein a rate of change of the relative distance of the first lens unit and the second lens unit with regard to a barrel rotation angle in each focusing section becomes smaller in the focusing sections of the telephoto side.

2. A camera according to claim 1, wherein said each focusing section has a constant movement amount of the focus position with regard to the barrel rotation angle.

3. A camera according to claim 1, wherein said each focusing section has a constant value which is the amount of movement of the focus position relative to the barrel rotation angle divided by the zoom lens F value.

4. A lens barrel comprising:
   a first lens unit;
   a second lens unit;
   a cam mechanism which moves the first lens unit and the second lens unit on a single zoom line consisted of plurality of focusing sections and plurality of zooming sections;
   wherein a rate of change of the relative distance of the first lens unit and the second lens unit with regard to a barrel rotation angle in each focusing section becomes smaller in the focusing sections of the telephoto side.

5. A lens barrel according to claim 4, wherein said each focusing section has a constant movement amount of the focus position with regard to the barrel rotation angle.

6. A lens barrel according to claim 4, wherein said each focusing section has a constant value which is the amount of movement of the focus position relative to the barrel rotation angle divided by the zoom lens F value.

7. A lens drive method which moves a plural lens unit on a single zoom line consisted of plurality of focusing sections and plurality of zooming sections, the method comprising:
   moving the lens units at a first rate of change of the relative distance of the lens units with regard to a barrel rotation angle in a first focusing section;
   moving the lens units at a second rate of change of the relative distance of the lens units with regard to the barrel rotation angle in a second focusing section which is positioned more towards a telephoto side of the plural lens unit than is the first focusing section,
   wherein the second rate is smaller than the first rate.

* * * * *